United States Patent [19]

Younger

[11] 4,210,034
[45] Jul. 1, 1980

[54] CHANNEL PLATE FOR AUTOMATIC TRANSMISSIONS

[76] Inventor: Gilbert W. Younger, 2621 Merced Ave., El Monte, Calif. 91733

[21] Appl. No.: 824,331

[22] Filed: Aug. 15, 1977

[51] Int. Cl.$^2$ ............................................. F16H 57/02
[52] U.S. Cl. .................................... 74/606 R; 60/458; 137/884
[58] Field of Search ...................... 74/606 R; 137/884; 60/458

[56] References Cited

U.S. PATENT DOCUMENTS

| | | | |
|---|---|---|---|
| 3,495,604 | 2/1970 | Trask | 137/884 |
| 3,530,884 | 9/1970 | Kutz | 137/884 |
| 3,548,849 | 12/1970 | Purcell | 137/884 |
| 3,840,047 | 10/1974 | Gibbins | 137/884 |

OTHER PUBLICATIONS

Chrysler, Chassis Service Manual-1972-Torqueflight Transmission-Section 21-Figures 53-58.
Chrysler-Chassis Body Manual-1978, Torqueflight Transmission, pp. 21-74, to 21-77.

*Primary Examiner*—Samuel Scott
*Assistant Examiner*—Wesley S. Ratliff, Jr.
*Attorney, Agent, or Firm*—Ralph B. Pastoriza

[57] ABSTRACT

A channel plate is provided for blocking transmission oil flow between two shift valves normally provided to effect automatic sequential shifting with changes in the pressure of the transmission oil. By inserting the channel plate, the gears in the transmission can only be shifted manually.

2 Claims, 3 Drawing Figures

CHANNEL PLATE FOR AUTOMATIC TRANSMISSIONS

This invention relates generally to automatic transmissions for automobile engines and more particularly to a channel plate structure to convert the automatic shifting to manual shifting.

BACKGROUND OF THE INVENTION

Most automatic transmissions for shifting gears in automobile engines comprise various sun and planetary gears with appropriate clutch plates and bands responsive to hydraulic oil pressure to hold one or more gears and thus change the effective ratio between input shaft speed from the engine and output shaft speed to the wheels. The heart of such transmission systems is a valve body containing various inter-related passages, valves, springs and orifices. The valve body receives signals in the form of hydraulic pressures which function to shift various ones of the shift valves to thereby route the transmission oil to appropriate clutch plates or bands and thus automatically effect sequential shifting within a given range. Mechanical shifting is effected by mechanical movement of other valves to change from a given shift range to another given shift range, this shifting normally being accomplished by the shift lever.

For most normal driving, there is only one position for the manual shift lever which is the drive or D position. Once the lever is placed in this position, the shifting of the gears is completely automatic. The same shift lever also serves to shift certain other valves to effect reverse movement of the automobile.

In effecting movement of the various shift valves to properly route the oil to appropriate clutch plates, the controlled hydraulic transmission oil pressure is used as described. This pressure is made responsive to the shaft speed as well as the shaft torque. The drive shaft speed is measured by a governor and this information is relayed to the valve body in the form of more or less hydraulic pressure by opening a specific valve a precise amount.

Thus, with the manual shift lever in the drive or "D" position, the automobile can be started from a rest position, the various gears automatically shifting from low through intermediate positions to high. While such shifting is completely automatic, the driver does have some control in that the manual shift lever usually includes 1 and 2 positions constituting low gear ratios as might be used when climbing a steep grade or as a braking feature when descending a steep grade. As mentioned, however, once the manual gear shift lever is set in one of its various positions, automatic shifting occurs within the given shift range of that position.

There are many instances, however, when a driver may wish to effect all shifting manually rather than have the shifting take place automatically. In the case of manual shifting, the driver would always start the vehicle in the number 1 or number 2 gear shift lever position and progress up to the drive or "D" position. In the "D" position, the gears would always be in "high" and would not automatically shift down or up with varying shaft speed and/or torque. Such manual shifting provides the driver with a maximum degree of control over the gears. Such might be desirable in certain racing car operations or in certain driving situations wherein it might be desirable to have the car remain in "low" regardless of its speed or torque requirements.

To eliminate the automatic shifting of a transmission so that the above referred to manual shifting can be effected normally would require a disassembly of the entire transmission system. Such a conversion operation is not only expensive and time consuming but in the event it is desired to convert the system back into automatic transmission shifting control, the same disassembly operation would be required.

BRIEF DESCRIPTION OF THE PRESENT INVENTION

With the foregoing considerations in mind, the present invention contemplates a simple and uniquely dimensioned channel plate arranged to be inserted between a normally provided valve cover and the entrance to bores containing shift levers normally provided in the valve body of the automatic transmission system. Essentially, the channel plate blocks transmission oil flow between the two shift valves in the adjacent bores which transmission oil flow is normally provided to effect automatic sequential shifting with changes in the pressure of the transmission oil. As a consequence, the gears in the transmission can only be shifted manually once the channel plate is in position.

BRIEF DESCRIPTION OF THE DRAWINGS

A better understanding of this invention will be had by referring to the accompanying drawings in which.

DETAILED DESCRIPTION OF THE INVENTION

Figure 1:
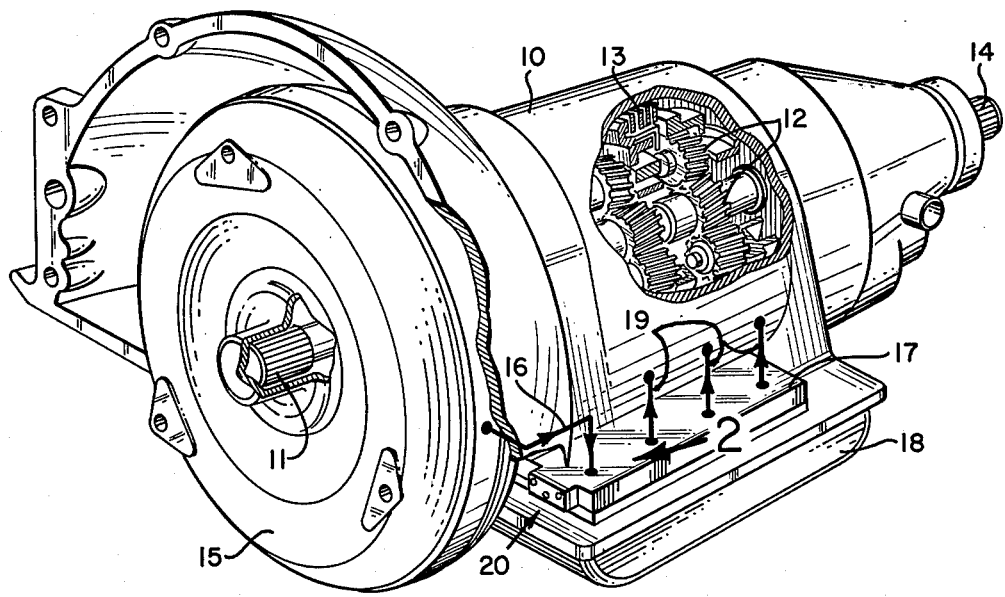
FIG. 1 is a perspective cut-away view of a typical automatic transmission system for an automobile, certain parts being depicted purely schematically for ease in explanation.

Referring first to FIG. 1, the automatic transmission is designated generally by the numeral 10 having an input shaft 11 from the automobile engine coupled by means of various planetary and sun type gears 12 provided with appropriate clutch plates and bands schematically indicated at 13 to an output shaft 14 connecting to the driving wheels of the vehicle. As described heretofore, the ratio of the input to output shaft speeds for the shafts 11 and 14 is controlled by the various gears within the transmission body 10 by means of the clutch plates and clutch bands which, when actuated, will "clutch" certain gears to prevent their rotation thereby effecting the desired change in speed ratio. The operation of the clutch plates and clutch bands is effected by hydraulic oil pressure routed to the appropriate plates and bands in accordance with the shaft speed and torque.

Thus, there is provided from appropriate transmission oil pump 15 transmission oil having a varying hydraulic pressure depending upon the shaft speed, torque etc. This transmission oil, as indicated schematically by the solid line 16 is passed to the transmission valve body 17 constituting the heart of the transmission system. The valve body 17 includes various inter-related passages, shift valves, springs and the like for routing the oil in the oil sump or pan 18 constituting an oil reservoir to the various clutch plates and bands, the passage of the oil from the valve body again being schematically depicted by the solid lines 19.

In accord with the present invention, to convert automatic shifting to manual shifting requires modification of only a certain portion of the valve body 17 as opposed to having to disassemble the entire transmission to effect such modification. This portion of the valve body 17 to be modified includes first and second shift valves involved in the automatic shifting from "low" to "high" and its location is designated generally by the arrow 20 in FIG. 1.

Figure 2:
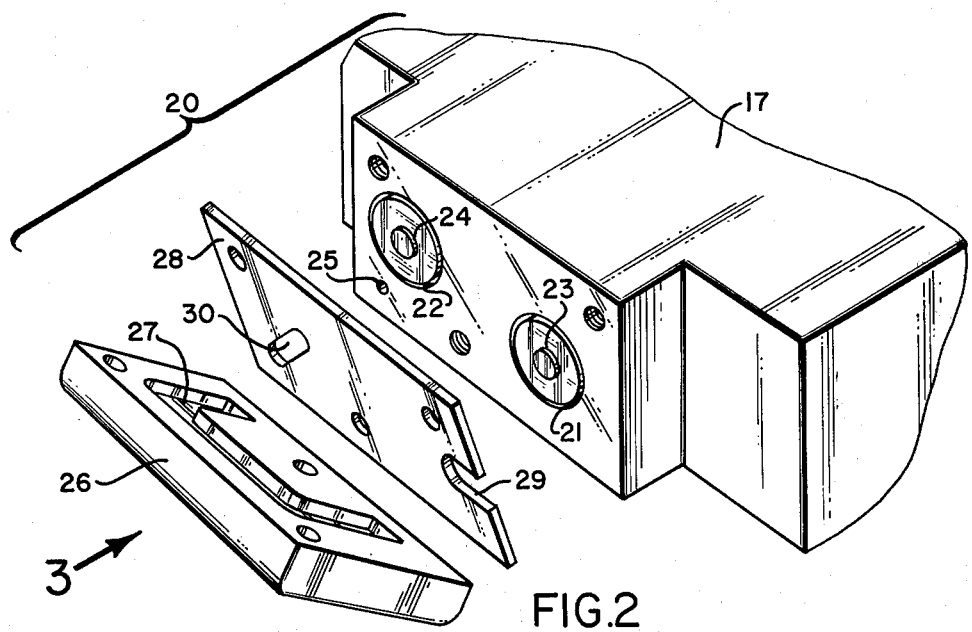
FIG. 2 is an enlarged exploded fragmentary perspective view of a portion of the valve body of the transmission system of FIG. 1 looking generally in the direction of the arrow 2; and, FIG. 3 is an end elevation of the assembled components shown in FIG. 2 wherein phantom lines are provided to depict the desired result.

Referring to FIG. 2, details of the valve body 17 as shown by the arrow 20 will be described. Thus, the normal valve body 17 includes in its side first and second bores 21 and 22 for receiving first and second shift valves portions of which are shown at 23 and 24 within the bores. It will be understood that there are springs associated with these valves such that the degree of hydraulic pressure exerted thereon to effect a movement or shifting can be appropriately adjusted. In addition, the diameter of the bores themselves receiving the shift valves are appropriately adjusted to adjust the area of the valve exposed to hydraulic pressure applied to the bores which again will determine the amount of hydraulic pressure necessary to move any specific shift valve.

The bores 21 and 22 with their corresponding shift valves 23 and 24 are normally both provided with transmission oil pressure controlled by the transmission governor as by way of a small port 25 and a valve cover plate 26 with a passage 27 therein placing the bores 21 and 22 into communication with the port 25. Thus, for automatic shifting, the cover plate 26 when placed directly over the bores 21 and 22 will result in the transmission oil being applied to both of the shift valves 23 and 24 by way of the passage 27. Because of the difference in the bore diameters, and the spring loading of the valves, sequential shifting of the valves will occur as the transmission oil pressure is increased.

To remove the automatic shifting feature so that the gears can be shifted only manually in accord with the present invention, there is provided a channel plate 28 for insertion between the valve cover plate 26 and entrances to the bores 21 and 22 to eclipse the passage 27 in the cover plate so that the oil flow through the passage is blocked. Under these conditions, automatic shifting of the valves with increasing hydraulic transmission oil pressure is prevented.

As is evident from FIG. 2, the channel plate 28 is in the form of a thin metal member which can be readily inserted simply by removing the cover plate 26 and sandwiching the channel plate 28 in position.

It will be noted that the channel plate 28, in addition to sealing off the passage 27 from the bores, further includes a side notch 29 arranged to register with the first bore 21 to exhaust oil therefrom to the exterior; that is, to the oil sump or oil pan 18 of FIG. 1. Also provided is an elongated opening 30 having one end positioned to register with the second bore 22 and its other end to register with the transmission oil inlet opening 25 so that the second bore is subject to governed transmission oil pressure.

Figure 3:
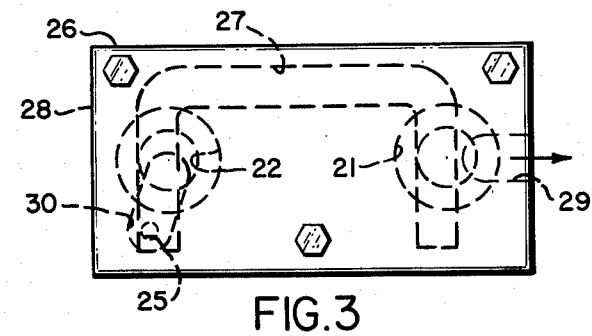

Referring to FIG. 3, the relative positions of the passage 27, bores 21 and 22, notch 29 and elongated opening 30 of the channel plate are depicted by phantom lines after the components have been assembled. Thus, it will be noted that with the channel plate 28 in position, the passage 27 in the valve cover 26 is sealed off from communication with the first bore 21, the oil in this bore being exposed or exhausted to the exterior by means of the side notch 29. The elongated opening 30 in the channel plate itself in turn places the second bore 22 into communication with the transmission oil port 25. This transmission oil pressure is received also in the passage 27 by way of the elongated opening 30 but since the other end of the passage 27 is completely eclipsed or sealed by the channel plate, there will be no communication of this transmission oil with the first bore 21.

Since the first shift valve 23 in the first bore 21 is no longer subject to the governed transmission oil pressure if the manual shift lever is placed in its "low" position, the transmission gears will always be in "low" regardless of the speed or torque of the transmission shaft. Shifting to a higher gear can then only be accomplished by manual shifting of the shift lever.

Should it be desired to reconvert the transmission system back to automatic shifting, it is a simple matter simply to remove the channel plate 28 and remount the valve cover 26 so that the bores 21 and 22 are again then placed in communication by way of the passage 27.

From the foregoing description, it will thus be evident that the present invention in the form of the channel plate 28 enables automatic shifting to be converted to manual shifting in an automatic transmission system without the necessity of disassemblying the entire transmission.

I claim:

1. In an automatic transmission for shifting gears, a channel plate for blocking transmission oil flow between two shift valves normally provided to effect automatic sequential shifting with changes in the pressure of said transmission oil so that the gears in said transmission can only be shifted manually, said two shift valves being receivable in side-by-side valve bores in the valve body for said automatic transmission, said bores normally being covered by a valve cover having an internal passage placing said bores in communication with each other and with the transmission oil, said channel plate comprising a thin metal member insertable between said valve cover and entrances to said bores to eclipse said passage so that oil flow through said passage is blocked, said metal member further including a side notch placing one of said bores in communication with the exterior of said valve body and an elongated opening placing the other of said bores in communication with said transmission oil.

2. In an automatic transmission for shifting gears in an automobile engine wherein there are provided first and second bores in the valve body of said transmission for receiving first and second shift valves and wherein a valve cover plate having a passage therein is dimensioned to overlie said bores with said passage placing said bores in communication with each other so that transmission oil pressure controlled by the transmission governor is applied from an opening adjacent to said second bore to both valves to effect a desired sequential shifting, a channel plate for insertion between said valve cover and said bores, (a) said channel plate being dimensioned to seal off said passage from said bores to block communication between said bores, and further including (b) a side notch registering with said first bore to exhaust oil therefrom, and (c) an elongated opening having one end positioned to register with said second bore and its other end to register with said transmission oil opening so that the first bore is exhausted and the second bore subject to governed transmission oil pressure thereby preventing automatic sequential shifting so that the transmission gears can only be shifted manually.

* * * * *